US011352981B1

(12) United States Patent
Mahaffy

(10) Patent No.: US 11,352,981 B1
(45) Date of Patent: Jun. 7, 2022

(54) MULTI-PULSE ROCKET PROPULSION MOTOR

(71) Applicant: EXQUADRUM, INC., Adelanto, CA (US)

(72) Inventor: Kevin E. Mahaffy, Oak Hills, CA (US)

(73) Assignee: EXQUADRUM, INC., Adelanto, CA (US)

( * ) Notice: Subject to any disclaimer, the term of this patent is extended or adjusted under 35 U.S.C. 154(b) by 178 days.

(21) Appl. No.: 16/530,315

(22) Filed: Aug. 2, 2019

(51) Int. Cl.
| | |
|---|---|
| F02K 9/28 | (2006.01) |
| F02K 1/00 | (2006.01) |
| F02K 9/36 | (2006.01) |
| F02K 9/70 | (2006.01) |
| F02K 9/26 | (2006.01) |
| F02K 9/34 | (2006.01) |
| F02K 9/97 | (2006.01) |
| F02K 9/84 | (2006.01) |
| F02K 9/08 | (2006.01) |
| F02K 9/80 | (2006.01) |
| B64G 1/40 | (2006.01) |

(52) U.S. Cl.
CPC ............... *F02K 9/28* (2013.01); *B64G 1/403* (2013.01); *F02K 1/002* (2013.01); *F02K 9/08* (2013.01); *F02K 9/26* (2013.01); *F02K 9/34* (2013.01); *F02K 9/36* (2013.01); *F02K 9/70* (2013.01); *F02K 9/80* (2013.01); *F02K 9/84* (2013.01); *F02K 9/97* (2013.01); *F02K 9/976* (2013.01)

(58) Field of Classification Search
CPC ... B64G 1/403; F02K 9/08; F02K 9/26; F02K 9/28; F02K 9/34; F02K 9/80; F02K 9/805; F02K 9/84; F02K 9/97; F02K 9/976
See application file for complete search history.

(56) References Cited

U.S. PATENT DOCUMENTS

| | | | | | |
|---|---|---|---|---|---|
| 3,698,598 | A | * | 10/1972 | Wood ................... | F16K 17/162 220/89.2 |
| 4,157,788 | A | * | 6/1979 | Canfield ................. | F02K 9/84 239/265.35 |
| 4,357,795 | A | * | 11/1982 | Bastian .................... | F02K 9/94 60/245 |
| 4,505,180 | A | * | 3/1985 | Hinrichs .................. | F02K 9/38 137/68.21 |

(Continued)

OTHER PUBLICATIONS

Braeunig; Rocket Propulsion, Feb. 15, 2004 (Year: 2004).*
National Technical Systems, The Ins and Outs of Propulsion Testing, Mar. 8, 2019 (Year: 2019).*

*Primary Examiner* — Todd E Manahan
*Assistant Examiner* — Kyle Robert Thomas
(74) *Attorney, Agent, or Firm* — Hamre, Schumann, Mueller & Larson, P.C.

(57) ABSTRACT

A multi-pulse rocket propulsion motor for use with vehicles, such as space vehicles like satellites, rockets, and the like. The propulsion motor is a modular system that is capable of providing a plurality of discrete, controllable propulsion pulses. The propulsion motor can be used for primary propulsion of the vehicle and/or as a maneuvering thruster of the vehicle. The propulsion motor includes a plurality of propellant housings each containing a combustible propellant grain, a discharge plenum defining a plenum volume in communication with the discharge of each propellant housing, and a nozzle downstream from and in fluid communication with the plenum volume.

23 Claims, 8 Drawing Sheets

(56) References Cited

U.S. PATENT DOCUMENTS

| | | | | |
|---|---|---|---|---|
| 5,024,160 | A | * | 6/1991 | Canterberry ........ B60R 21/2644 |
| | | | | 102/290 |
| 5,419,118 | A | * | 5/1995 | McSpadden ............ F02K 7/075 |
| | | | | 60/250 |
| 8,242,422 | B2 | * | 8/2012 | Olden ................... F42B 10/661 |
| | | | | 244/3.1 |
| 8,667,776 | B2 | * | 3/2014 | Olden ....................... F02K 9/28 |
| | | | | 60/250 |
| 2005/0115439 | A1 | * | 6/2005 | Abel ........................ F02K 9/26 |
| | | | | 102/288 |
| 2011/0006152 | A1 | * | 1/2011 | Olden .................... F42B 15/01 |
| | | | | 244/3.22 |
| 2012/0036831 | A1 | * | 2/2012 | Olden ....................... F02K 9/36 |
| | | | | 60/250 |
| 2012/0167575 | A1 | * | 7/2012 | Dobek ................... F02K 9/976 |
| | | | | 60/771 |

* cited by examiner

MULTI-PULSE ROCKET PROPULSION MOTOR

This invention has been made with Government support under Contract Number H92405-18-00005, awarded by the U.S. Department of Defense. The Government has certain rights in the invention.

FIELD

This technical disclosure relates to a rocket propulsion motor for use with vehicles, such as but not limited to, space vehicles like satellites, rockets, and the like. In some embodiments, the rocket propulsion motor described herein can be used with aircraft and other aerial flight vehicles.

SUMMARY

A multi-pulse rocket propulsion motor for use with vehicles, such as space vehicles like satellites, rockets, and the like, is described. The propulsion motor is a modular system that is capable of providing a plurality of discrete, controllable propulsion pulses. The propulsion motor can be used for primary propulsion of the vehicle and/or as a maneuvering thruster of the vehicle. The propulsion system described herein provides a number of advantages including, but not limited to, high thrust, high impulse density, small power consumption, simplicity, increased reliability, and superior specific impulse performance.

If the propulsion motor is used with a space vehicle, the space vehicle can be an orbital space vehicle or a sub-orbital space/flight vehicle. The term "space vehicle" is intended to cover any manned or unmanned vehicle intended for orbital travel, sub-orbital travel, or deep space travel. The space vehicle can be designed to be expendable or re-usable. In some embodiments, the propulsion motor described herein can be used on aircraft and other aerial flight vehicles.

The propulsion motor described herein includes a plurality of propellant housings each of which contains a combustible propellant, such as a solid propellant grain. Each propellant housing discharges combustion gas resulting from combustion of the combustible propellant therein into a common plenum volume of a discharge plenum. The combustion gas is then discharged through a nozzle to generate thrust. Each propellant housing provides the propulsion motor with at least one discrete propulsive pulse when the propellant therein is ignited.

Each propellant charge (i.e. grain) in each propellant housing has an orifice that back pressures the propellant housing and allows the solid propellant grain to quickly reach a pressure that allows it to combust efficiently. The orifice facilitates solid propellant ignition and efficient combustion. Then the combustion gases enter a common plenum volume and thereafter exit through a common nozzle so that the thrust is along the centerline of the vehicle that is being propelled to minimize inducing a tumbling of the vehicle.

The nozzle of the propulsion motor can be provided with various features to control the thrust of the propulsion motor. For example, the thrust vector of the nozzle can be controlled using a thrust vector control system. In one embodiment, the thrust vector control system can comprise the nozzle defining a ball, and the discharge plenum defining a socket that receives the ball, and at least one actuator connected to the nozzle whereby the nozzle can tilt relative to the discharge plenum as a result of the ball and socket connection between the nozzle and the discharge plenum. The tilting or vectoring of the nozzle helps to prevent or minimize any spinning moment on the space vehicle due to a misalignment between the center of gravity of the space vehicle and the thrust vector.

The thrust of the nozzle can also be controlled by a nozzle extension that is movably mounted on the nozzle so that the nozzle extension can be movable relative to the nozzle from a retracted or stowed position to an extended or deployed position. The nozzle has a first expansion ratio when the nozzle extension is at the retracted position, and the nozzle has a second expansion ratio when the nozzle extension is at the extended position, and the first expansion ratio is less than the second expansion ratio. At least one actuator is connected to the nozzle extension to actuate the nozzle extension from the retracted position to the extended position. In some embodiments, the actuator used to actuate the nozzle extension can be the same actuator used to tilt the nozzle. However, in other embodiments, separate actuators can be used.

In one embodiment, at least one calibration propellant housing can be provided that contains a combustible propellant grain in an amount that is less than the amount of combustible propellant grain contained in each of the propellant housings. The calibration propellant housing has a discharge orifice that is in communication with the plenum volume and through which combustion gas from the at least one calibration propellant housing can be discharged into the plenum volume. The calibration propellant housing has a fraction of the impulse of the propellant housings, and is used to generate a small (or calibration) impulse, for example to test the alignment of the nozzle relative to the center of gravity of the vehicle.

In one specific embodiment, a rocket propulsion motor can include a plurality of propellant housings each containing a combustible propellant. Each propellant housing has a first end, a second end, and a discharge orifice at the first end through which combustion gas resulting from combustion of the combustible propellant can be discharged. The propulsion motor can further include a discharge plenum that defines a plenum volume, and each one of the discharge orifices can be placed in communication with the plenum volume of the discharge plenum whereby each propellant housing can discharge combustion gas into the plenum volume. In addition, a nozzle having a nozzle axis is downstream from and in fluid communication with the plenum volume and through which combustion gas from the plenum volume is exhausted to generate thrust.

In another specific embodiment, a propulsion motor for a space vehicle can include at least three propellant housings each containing solid propellant grain. Each propellant housing has a first end, a second end, an ignition initiator that is configured to ignite the solid propellant grain, and a discharge orifice at the first end through which combustion gas resulting from combustion of the solid propellant grain can be discharged. The propulsion motor can also include a single discharge plenum defining a plenum volume, and each one of the discharge orifices can be placed in communication with the plenum volume whereby each propellant housing can discharge combustion gas into the plenum volume. Each discharge orifice has means, such as a rupturable membrane or a seal, for temporarily preventing communication between combustion gas in the plenum volume and the solid propellant grain in the associated propellant housing. In addition, a nozzle is connected to the discharge plenum and receives combustion gas from the plenum volume. The nozzle has a nozzle axis and a throat, and combustion gas from the plenum volume flows through the nozzle to generate thrust.

DRAWINGS

DETAILED DESCRIPTION

Figure 1:
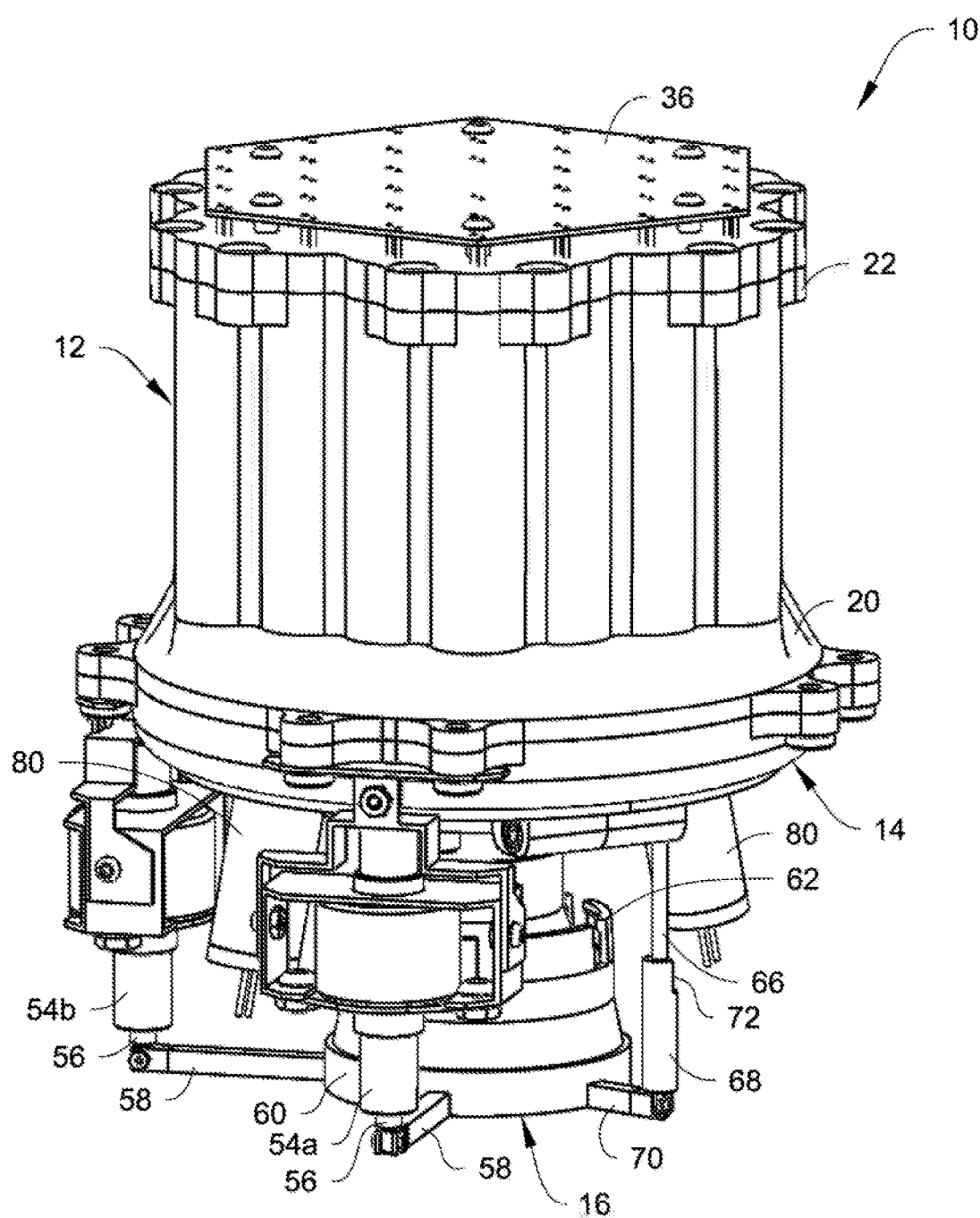
FIG. 1 is a perspective view of the rocket propulsion motor described herein with the nozzle extension in a retracted or stowed position.

With reference initially to FIGS. 1-4, a rocket propulsion motor 10 (or motor 10) described herein is illustrated. The rocket propulsion motor 10 includes a plurality of propellant housings 12, a discharge plenum 14 in communication with each one of the propellant housings 12, and a nozzle 16. The rocket propulsion motor 10 is preferably modular in construction whereby various parts of the rocket propulsion motor 10, such as the propellant housings 12, the discharge plenum 14, and the nozzle 16 can be replaced or exchanged with other like parts.

Figure 5:
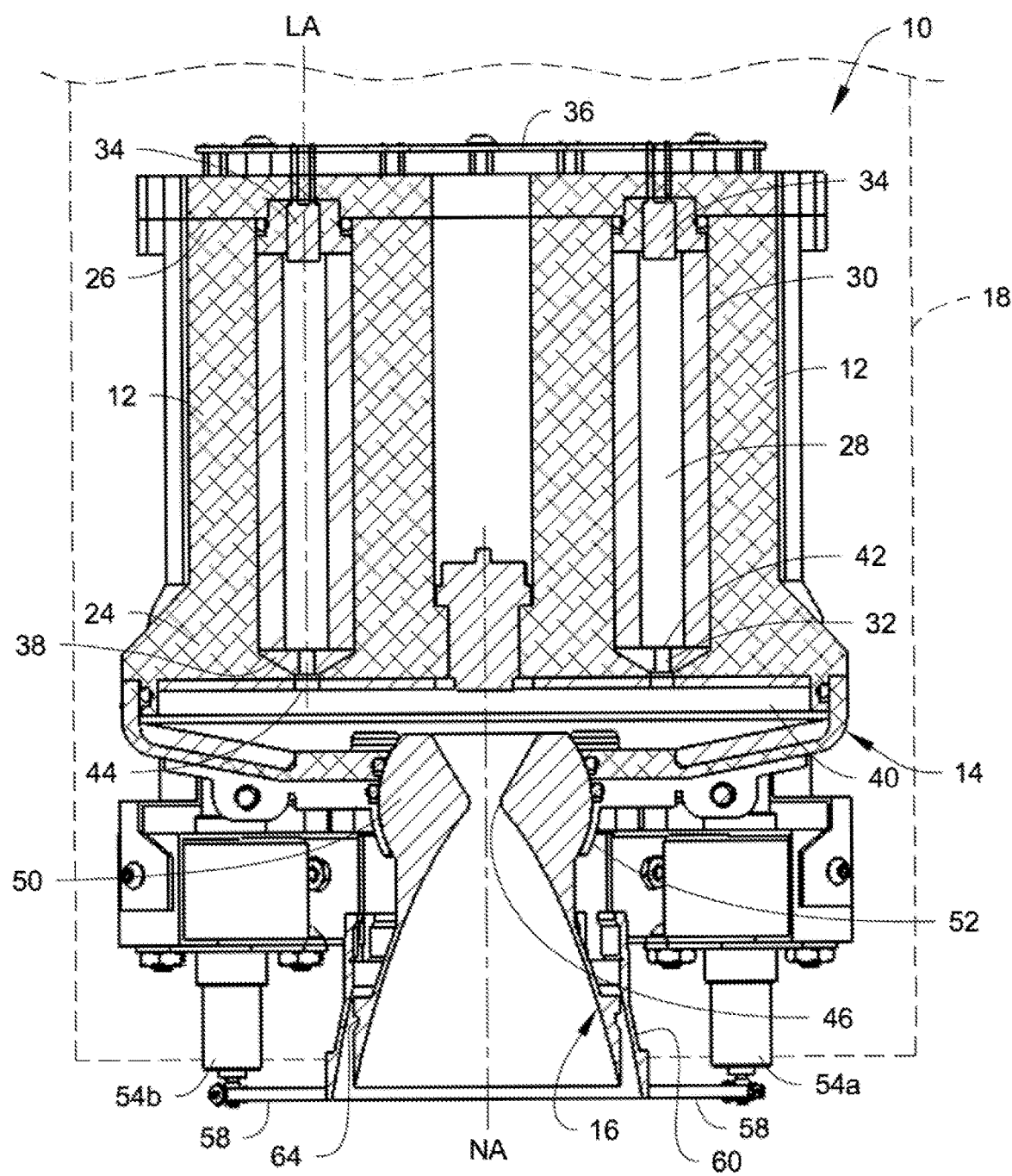
FIG. 5 is a longitudinal cross-sectional view of the rocket propulsion motor of FIG. 1 with the nozzle extension in the retracted or stowed position.

As depicted in FIG. 5, the rocket propulsion motor 10 can be incorporated into a suitable vehicle 18 (a portion of which is depicted in dashed lines). The vehicle 18 can be any vehicle that would benefit from use of the rocket propulsion motor 10 described herein. Examples of the vehicle 18 include, but are not limited to, space vehicles (or space craft) such as satellites, rockets, and the like; aircraft and other aerial flight vehicles. In the case of a space vehicle, the space vehicle can be manned or unmanned; orbital, sub-orbital, or deep space. The vehicle 18, and in some embodiments the rocket propulsion motor 10 itself, can be expendable or re-usable. As described in more detail below, the rocket propulsion motor 10 is configured to provide a plurality of discrete, controllable propulsion pulses to the vehicle it is mounted on. The rocket propulsion motor 10 can be used for primary propulsion of the vehicle and/or as a maneuvering thruster of the vehicle.

Referring to FIGS. 1-6, the propellant housings 12 comprise a plurality of the propellant housings 12 arranged into a unified assembly that has a base end 20 removably secured to the discharge plenum 14, and an upper end 22. In an alternative embodiment, the propellant housings 12 can be physically separate from one another, but nonetheless secured together into a unified assembly. Preferably there are at least two of the propellant housings 12. In the illustrated example, there are 36 of the propellant housings 12. However, there can be any number of the propellant housings 12 between 2 and 36, and in some embodiments there can be more than 36 of the propellant housings 12.

Referring to FIG. 5, each propellant housing 12 has a first end 24, a second end 26, a longitudinal axis LA, an interior space 28 containing a combustible propellant grain 30 and a discharge orifice 32 at the first end 24 through which combustion gas resulting from combustion of the combustible propellant grain 30 can be discharged from the propellant housing 12. The combustible propellant grain 30 can be a solid propellant. The use of solid propellant grain is beneficial because it cannot leak like liquid propellants, and the use of solid propellant grain does not require pressurization and permits a wide environmental temperature tolerance. The solid propellant grain can be any known solid propellant used for rocket propulsion, such as, but not limited to, an ammonium perchlorate (AP)/hydroxyl-terminated polybutadiene (HTPB) propellant. As seen in FIG. 5, the solid propellant grain 30 lines the interior of each propellant housing 12 from the first end 24 to the second end 26.

Still referring to FIG. 5, each propellant housing 12 further includes an ignition initiator 34 that is configured to ignite the propellant grain 30 within the associated propellant housing 12. The ignition initiators 34 are illustrated as being disposed at the second ends 26 of the propellant housings 12, and each one of the initiators 34 is connected to a common ignition cap assembly 36. However, in other embodiments, the ignition initiators 34 can be located at the first ends 24 of the propellant housings 12 as described below with respect to FIGS. 7 and 8. A suitable controller, for example a control system for the vehicle 18, is electrically connected to the ignition initiators 34 to individually and controllably ignite the propellant grain 30 within each propellant housing 12.

Combustion of the propellant generates combustion gas which is discharged from the interior space of the propellant housing 12 via the discharge orifice 32. In the illustrated example of FIG. 5, an insert 38 is disposed at the first end 24 of each one of the propellant housings 12, and each insert 38 defines the discharge orifice 32 of the associated propellant housing 12.

With continued reference to FIG. 5, the discharge plenum 14 defines a common plenum volume 40 into which each one of propellant housings 12 can discharge combustion gas through the discharge orifices 32. Each discharge orifice 32 has a primary gas seal 42 associated therewith that prevents communication between combustion gas in the plenum volume 40 and the combustible propellant grain 30 in the associated propellant housing 12 prior to ignition. Each seal 42 prevents hot combustion gas discharged into the plenum volume 40 from one of the propellant housings 12 from flowing into the other (or unused) propellant housings 12 and prematurely igniting the propellant grain 30. Therefore, each seal 42 forms a means for temporarily preventing communication between combustion gas in the plenum volume 40 and the propellant grain 30 in the associated propellant housing 12. Each seal 42 can have any construction for performing the functions of the seal 42. In one embodiment, each seal 42 can be a thin membrane that is rupturable by the pressure of the combustion gas generated within each propellant housing 12 when the propellant grain 30 is ignited whereby each seal 32 prevents communication between combustion gas in the plenum volume 40 and the propellant grain 30 in the associated propellant housing until the seal 42 is ruptured.

In some embodiments, secondary gas seals 44 (seen in FIG. 5) can also be provided on the flat plenum face for the purpose of preventing the interior space 28 of a spent propellant housing 12 from being pressurized by gas from subsequent firings of other propellant housings 12, which would decrease performance of the rocket propulsion motor 10. Each secondary gas seal 44 can have any construction that prevents the flow of gas from the plenum volume 40 into the interior space 28 of a spent propellant housing 12. In one non-limiting example, each secondary gas seal 44 may take the form of a miniature reed valve that would close when the pressure in the plenum volume 40 exceeds the pressure inside the interior space 28 of the propellant housing 12.

Referring to FIGS. 1-6, gas in the common plenum volume 40 exits through the nozzle 16 to generate thrust. The nozzle 16 is downstream from and in fluid communication with the plenum volume 40 and the nozzle has a nozzle axis NA that, in the configuration shown in FIG. 5 is parallel to the longitudinal axes LA of the propellant housings 12. However, as discussed in further detail below, the axis NA of the nozzle 16 can be adjusted so that the axis NA is no longer parallel to the longitudinal axes LA.

Figure 6:
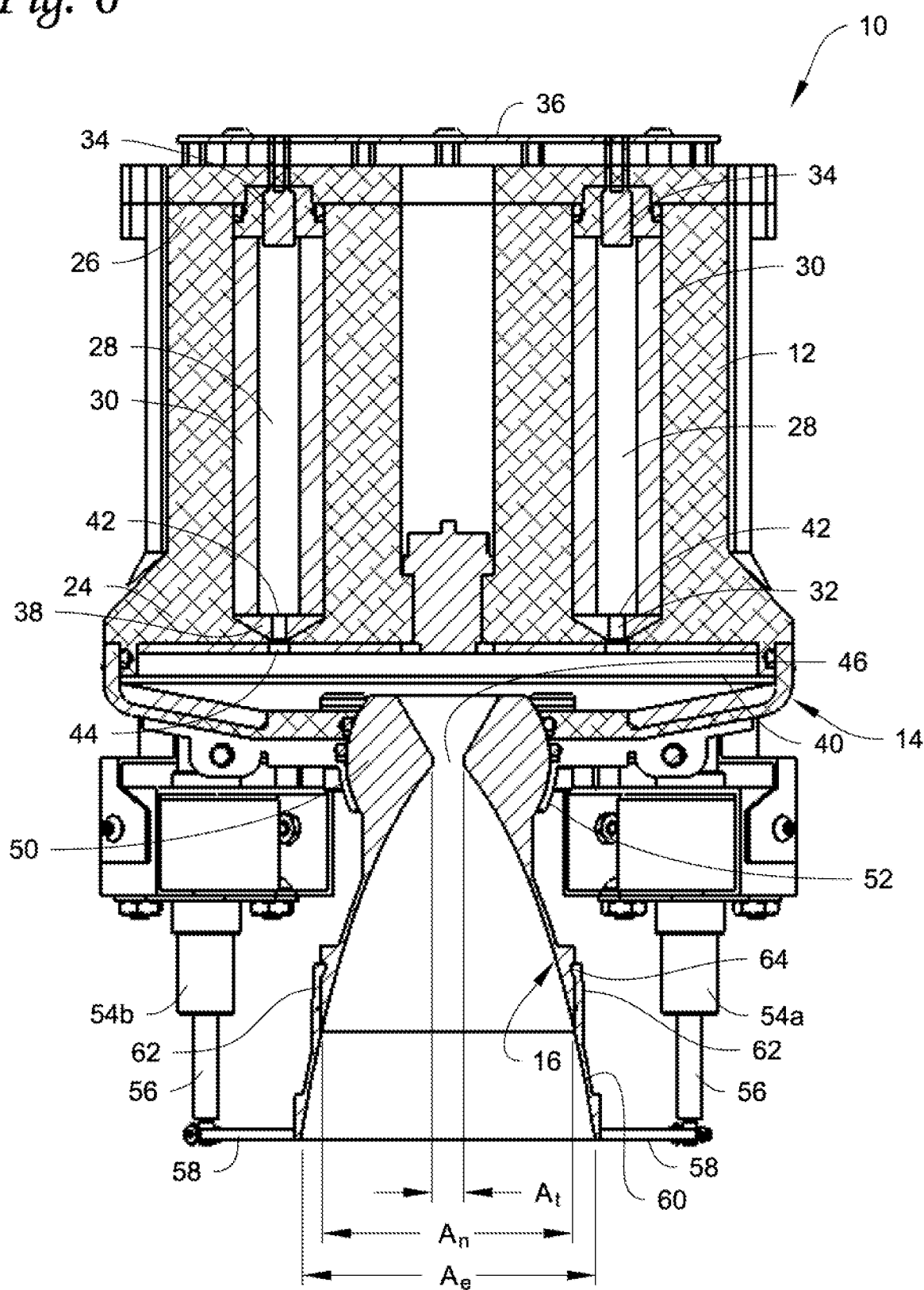
FIG. 6 is a longitudinal cross-sectional view of the rocket propulsion motor of FIG. 1 with the nozzle extension in the extended or deployed position.

Referring to FIGS. 5 and 6, the nozzle 16 is preferably a high expansion ratio nozzle, where the expansion ratio is defined as an area of an exit of the nozzle 16 ($A_e$) divided by an area of a throat 46 ($A_t$) of the nozzle 16. In one embodiment, the nozzle 16 can have an expansion ratio of about 90:1.

As best seen in FIGS. 5 and 6, the discharge plenum 14 is part of a structure that is separate from the nozzle 16. In addition, the nozzle 16 defines a ball 50, and the discharge plenum 14 defines a socket 52 that receives the ball 50. The ball 50 and socket 52 permit the nozzle 16 to tilt or gimbal in pitch and yaw axes relative to the discharge plenum 14, thereby changing the angle of the nozzle axis NA and changing the thrust vector of the rocket propulsion motor 10. In one non-limiting embodiment, the ball 50 and socket 52 can permit the nozzle 16 to tilt or gimbal about ±5°.

Referring to FIGS. 1-6, actuators 54a, 54b are connected to the nozzle 16 and are configured to tilt the nozzle 16 relative to the discharge plenum 14. In the illustrated embodiment, each actuator 54a, 54b can be a linear actuator having an output rod 56 with an axis that is parallel to the nozzle axis NA of the nozzle 16. The end of each rod 56 is connected to a linkage arm 58 that is connected to the nozzle 16.

With reference to FIGS. 5 and 6, the nozzle 16 includes a nozzle extension 60 that is movably mounted thereon for movement from a retracted or stowed position (FIG. 5) to an extended or deployed position (FIG. 6). The nozzle extension 60 comprises a cylindrical sleeve that surrounds the nozzle 16 and that is movable in a direction parallel to the nozzle axis NA when actuated from the retracted position to the extended position. The nozzle extension 60 is intended to increase the expansion ratio of the nozzle 16 which increases the thrust and the specific impulse of the rocket propulsion motor 10. For example, referring to FIG. 6, the nozzle 16 has a first expansion ratio ($A_n$ divided by $A_t$) when the nozzle extension 60 is at the retracted position, and the nozzle 16 has a second expansion ratio ($A_e$ divided by $A_t$) when the nozzle extension 60 is at the extended position. Because the area $A_n$ is less than the area $A_e$, the first expansion ratio is less than the second expansion ratio.

At least one actuator is connected to the nozzle extension 60 to actuate the nozzle extension 60 from the retracted position to the extended position. In the illustrated example, the actuators 54a, 54b can be used to actuate the nozzle extension 60. In particular, the linkage arms 58 are connected to the nozzle extension 60 so that when the actuators 54a, 54b extend the output rods 56, the nozzle extension 60 is actuated from the retracted position to the extended position. In other embodiments, separate actuators can be provided to actuate the nozzle extension 60 and to cause the tilting of the nozzle 16.

Once the nozzle extension 60 reaches the extended position, the nozzle extension 60 locks into position. Any means for retaining the nozzle extension 60 at the extended position can be used. Referring to FIGS. 3-6, in the illustrated example an upper end of the nozzle extension 60 includes a plurality of tabs 62 circumferentially spaced from one another about the circumference of the nozzle extension 60. The inner surfaces of the tabs 62 are enlarged to form a detent. In addition, a circumferential locking or detent channel 64 is formed about the circumference of the nozzle 16. When the nozzle extension 60 reaches the extended position, the detents of the tabs 62 snap into the channel 64 thereby locking the nozzle extension in the extended position.

Figure 2:
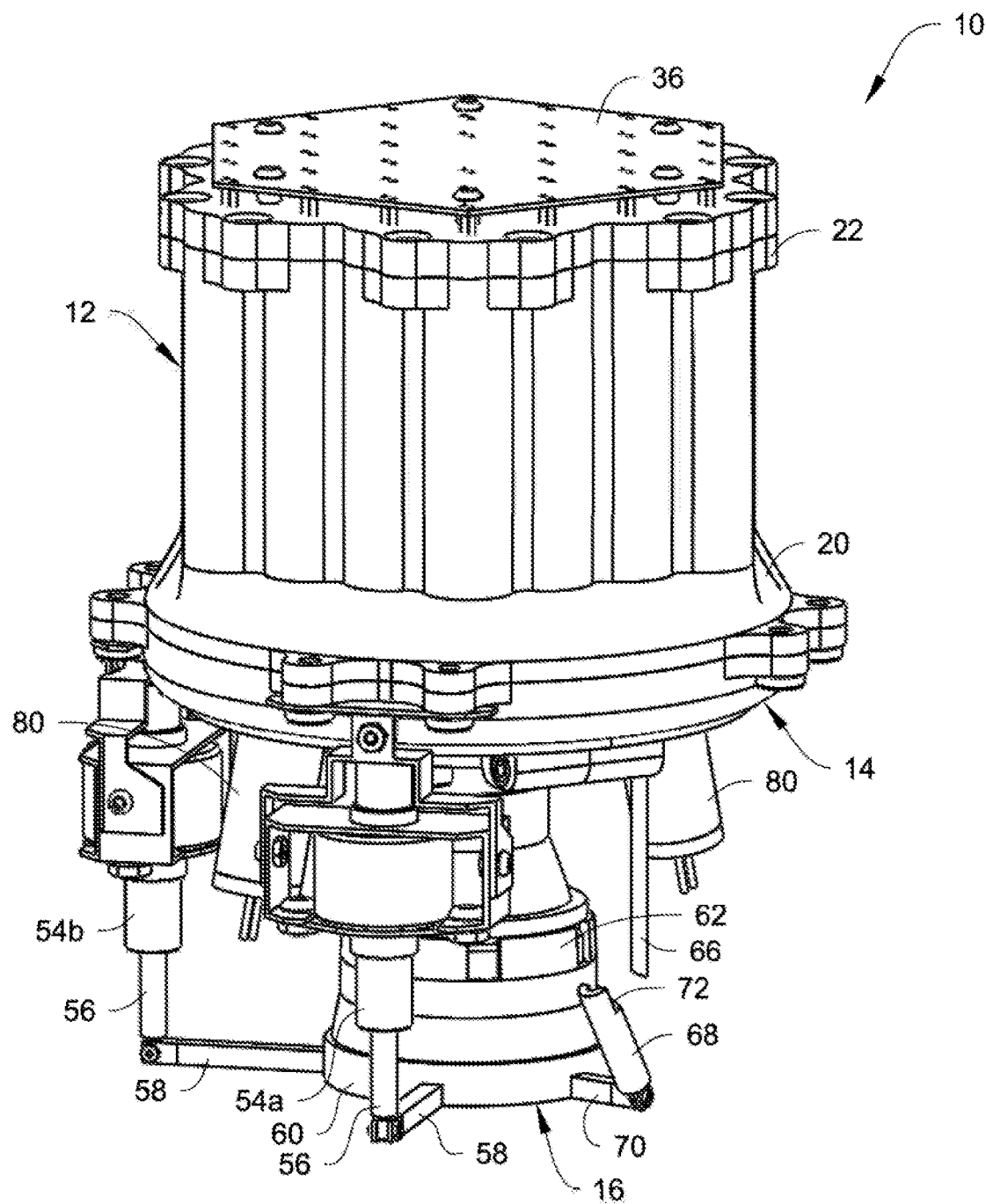
FIG. 2 is a perspective view similar to FIG. 1 but with the nozzle extension in an extended or deployed position.

In one embodiment, it is preferred that the nozzle 16 be provided with means to prevent the nozzle from tilting until the nozzle extension 60 is locked in the extended position. Any means for preventing such tilting can be used. For example, referring to FIGS. 1-4, in the illustrated example an extension guide rod 66 is connected to and extends downwardly from the discharge plenum 14. In addition, a guide sleeve 68 is connected to and extends upwardly from the nozzle extension 60. The guide sleeve 68 is pivotally connected to a link arm 70 that extends from the nozzle extension 60. As best seen in FIGS. 1-2, an upper end of the guide sleeve 68 includes a cut-out section 72.

Figure 3:
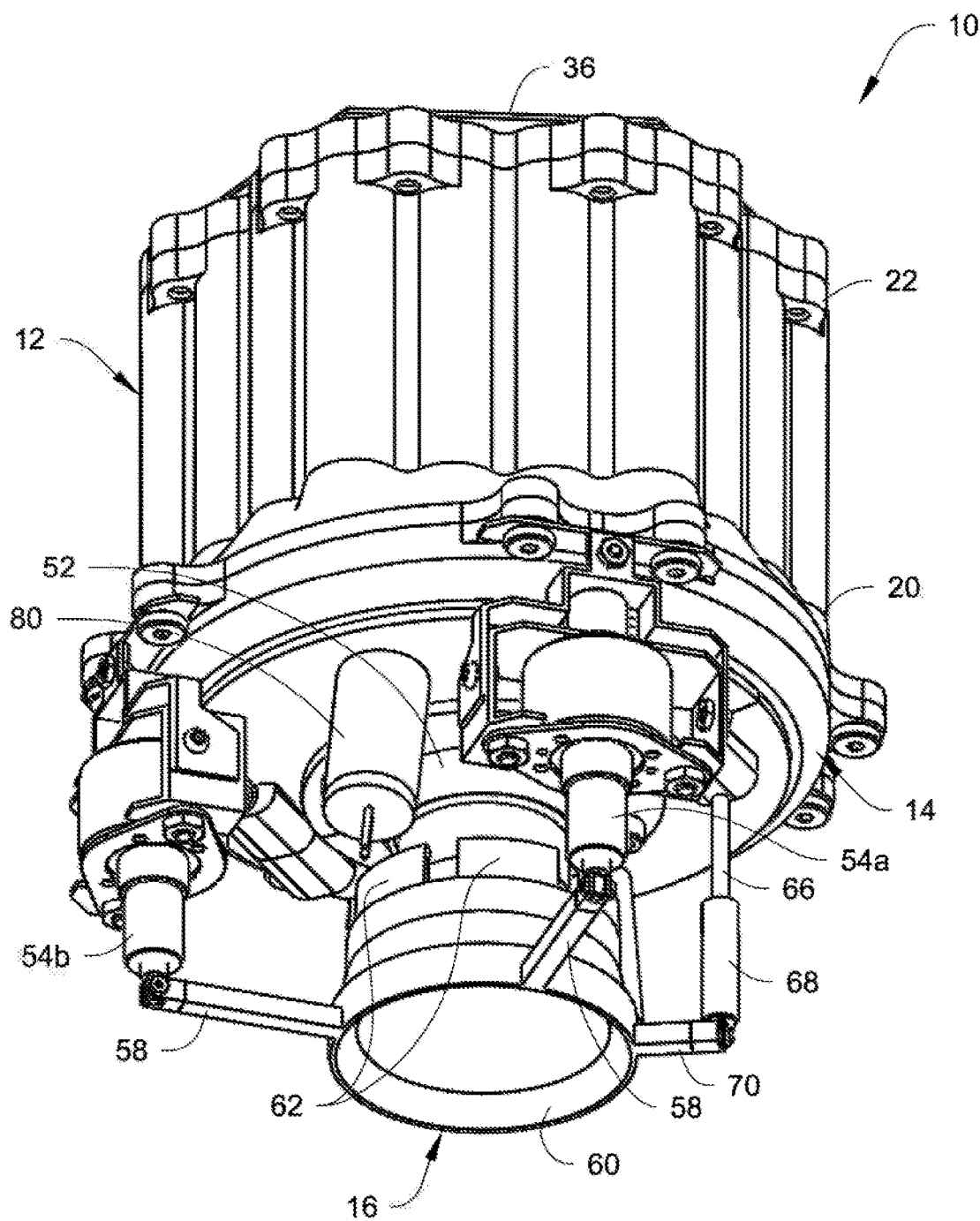
FIG. 3 is another perspective view of the rocket propulsion motor with the nozzle extension in the retracted or stowed position.
Figure 4:
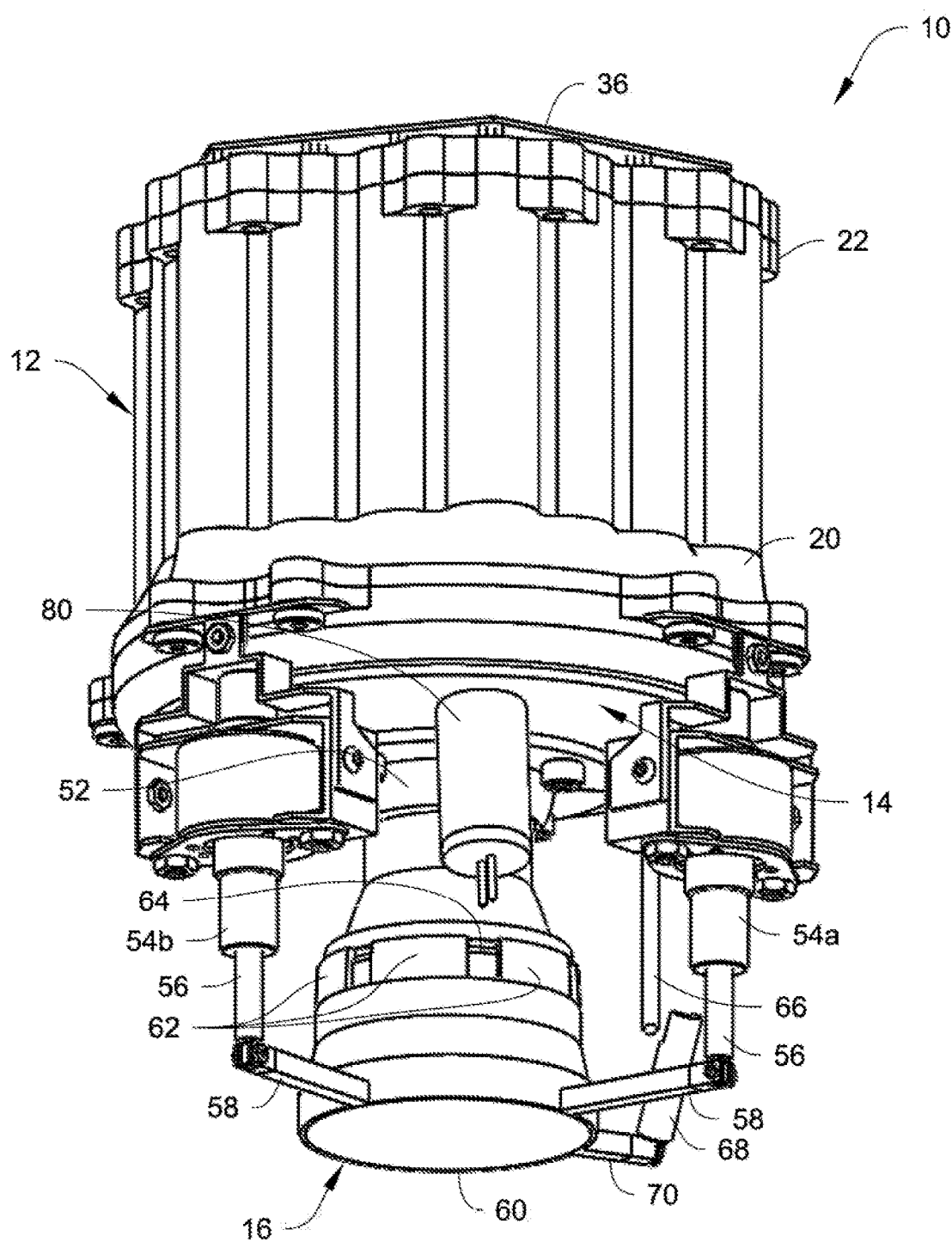
FIG. 4 is another perspective view of the rocket propulsion motor with the nozzle extension in the extended or deployed position.

At the retracted position of the nozzle extension 60, the guide rod 66 is disposed inside of and slides within the guide sleeve 68 as best seen in FIGS. 1 and 3, which prevents tilting of the nozzle 16. When the nozzle extension 60 reaches the extended position and locks into position, the end of the guide rod 66 reaches the cut-out section 72. The guide sleeve 68 can then pivot out of the way as best seen in FIGS. 2 and 4, if necessary aided by a spring bias acting on the guide sleeve 68. The nozzle 16 is now free to tilt under control of the actuators 54a, 54b.

Referring to FIGS. 1-4, the rocket propulsion motor 10 can have at least one calibration propellant housing 80. The illustrated example is shown as having two of the calibration propellant housings 80, although a single calibration propellant housing 80 or more than two calibration propellant housings 80 can be provided. Each calibration propellant housing 80 is configured to provide an impulse that is a fraction of the impulse provided by each one of the propellant housings 12. Each calibration propellant housing 80 is used to generate a small impulse (also referred to as a calibration pulse) to test the alignment of the nozzle 16 relative to the center of gravity of the vehicle 18. FIGS. 1-4 illustrate the calibration propellant housings 80 as being mounted to the bottom of the discharge plenum 14. However, the calibration propellant housings 80 can be part of the main array of the propellant housings 12 as well.

Each one of calibration propellant housings 80 contains solid propellant grain in an amount that is less than the amount of solid propellant grain 30 contained in each of the propellant housings 12. In addition, each calibration propellant housing 80 has a discharge orifice that is in communication with the plenum volume 40 and through which combustion gas from the calibration propellant housings 80 can be discharged. Combustion of the propellant grain in the calibration propellant housing(s) 80 is initiated by an ignition initiator which can be similar to the ignition initiators 34 of the propellant housings 12.

One or more controllers are provided to control operation of the rocket propulsion motor. For example, the one or more controllers generate control signals to control the operation of the actuators 54a, 54b. In addition, the one or more controllers can receive control commands for desired nozzle position from the vehicle 18 or from a ground station that controls the vehicle 18. In addition, the one or more controllers can generate control signals to control the operation of the ignition initiators 34. The one or more controllers can be located at the upper end of the rocket propulsion motor, for example on the ignition cap assembly 36.

In the embodiment illustrated in FIGS. 1-6, the propellant grain 30 is ignited at the second end 26 at burns toward the first end 24. In an alternative embodiment illustrated in FIG. 7, the propellant grain 30 can be ignited at the first end 24 and burn to toward the second end 26 in what can be referred to as an end burner configuration.

Figure 7:
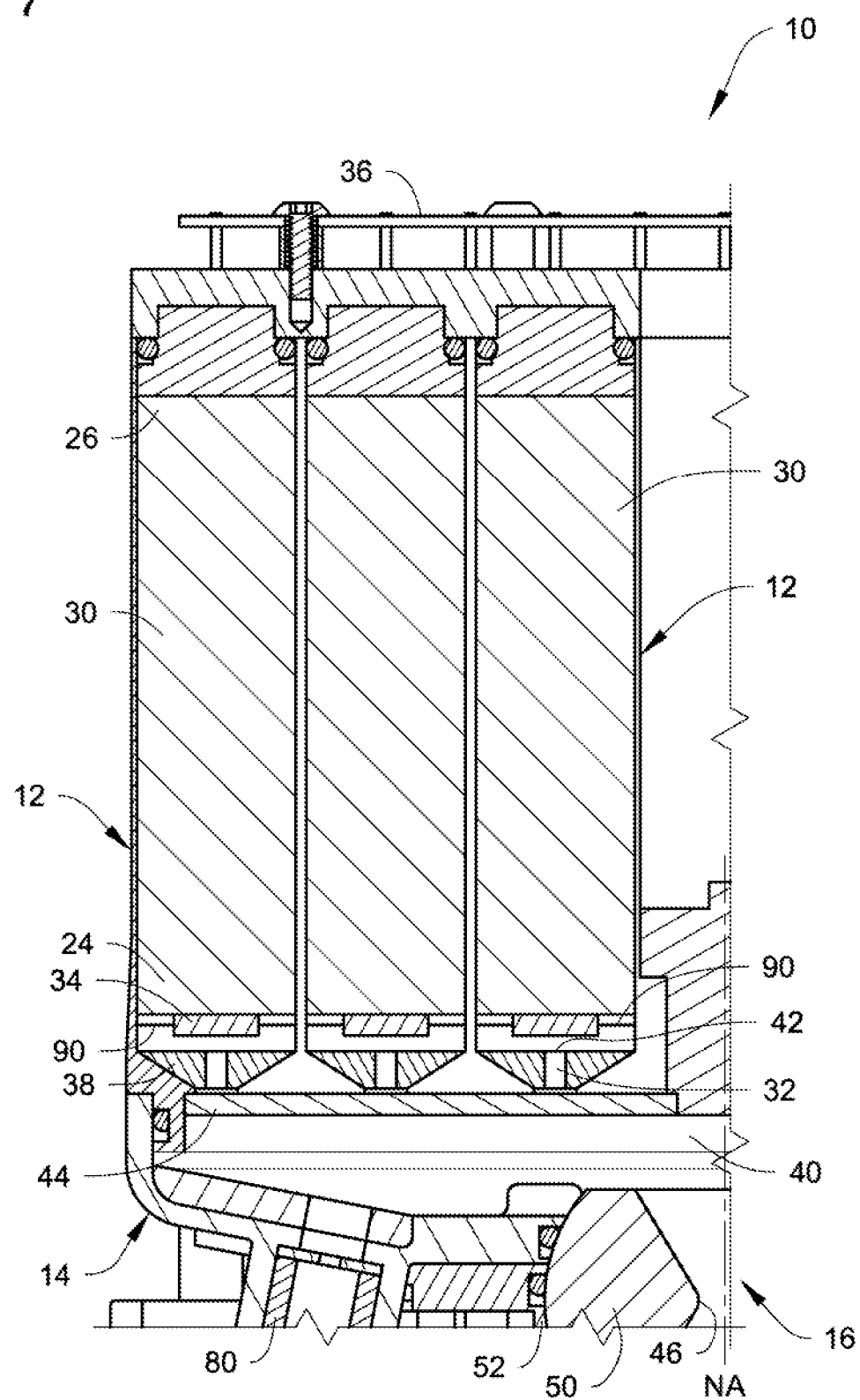
FIG. 7 is a longitudinal cross-sectional view of a portion of another embodiment of a rocket propulsion motor described herein.

FIG. 7 illustrates a portion of another embodiment of the rocket propulsion motor 10 that uses end burner propellant grains where the propellant grain 30 burns from the first end 24 of each one of the propellant housings 12 toward the second end 26. In FIG. 7, elements that are similar or identical to elements in the embodiment in FIGS. 1-6 are referenced using the same reference numbers. In this embodiment, the propellant grain 30 is solid within each of the propellant housings 12 unlike the embodiment in FIGS. 1-6 where a central passageway is formed through the propellant grain 30 to allow passage of the combustion gas to the orifice 32. This permits an increase in the amount of propellant grains in each propellant housing 12, thereby increasing the amount of pulse that each propellant housing 12 can provide. In addition, the ignition initiators 34 are located at the first ends 24 of the propellant housings 12. The ignition initiators 34 are connected to electrical leads 90 that carry electrical energy for activating the ignition initiators 34. The electrical leads 90 can be in electrical communication with the common ignition cap assembly 36 or other source of electrical energy. This embodiment operates generally similarly to the embodiment in FIGS. 1-6, whereby once the propellant grain 30 is ignited within one of the propellant housings 12, the pressure of the combustion gas ruptures the seal 42 and the combustion gas flows through the orifice 32 and into the plenum volume 40, and then out the throat 46 and the nozzle 16. In FIG. 7, the propellant housings 12 in the non-illustrated other half of the motor 10 on the other side of the nozzle axis NA can be similar to the illustrated propellant housings 12 with the end burner propellant grains, or the other propellant housings 12 can have a construction similar to the propellant housings 12 in FIGS. 1-6.

Figure 8:
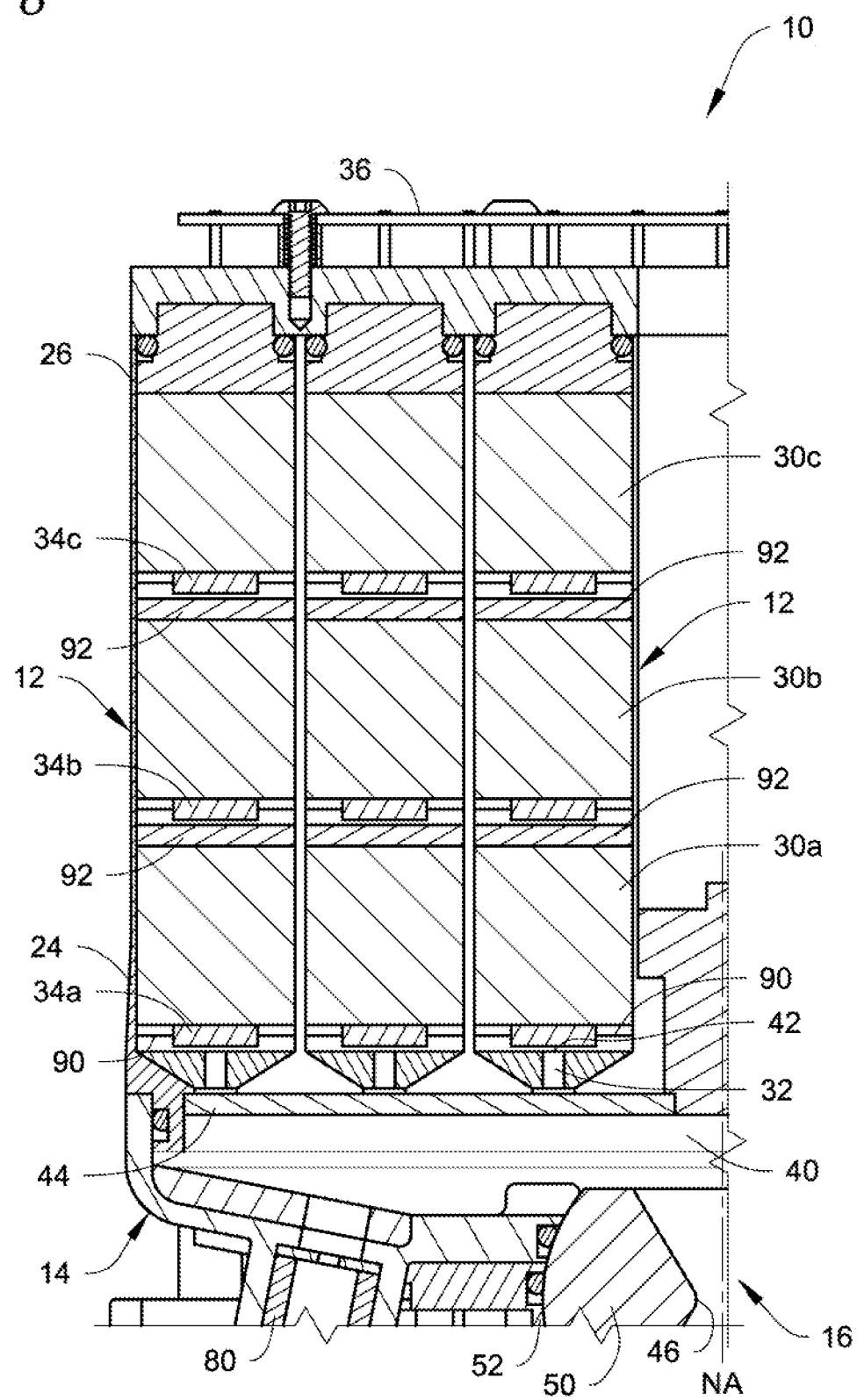
FIG. 8 is a longitudinal cross-sectional view of a portion of still another embodiment of a rocket propulsion motor described herein.

FIG. 8 illustrates a portion of another embodiment of the rocket propulsion motor 10 that also uses end burner propellant grains like in FIG. 7 in each one of the propellant housings 12. In FIG. 8, elements that are similar or identical to elements in the embodiments in FIGS. 1-6 and 7 are referenced using the same reference numbers. In this embodiment, each one of the propellant housings 12 can be provided with multiple, discrete and separate end-burner solid propellant grains 30a, 30b 30c. This embodiment permits each propellant housing 12 to provide multiple pulses. In the illustrated embodiment, each propellant housing 12 is shown as having 3 of the propellant grains 30a, 30b, 30c. However, in other embodiments, 2 of the propellant grains can be used, or more than 3 of the propellant grains can be used. In addition, in other embodiments, not all of the propellant housings 12 need to multiple propellant grains. Instead, some of the propellant housings 12 can include multiple propellant grains 30a, 30b, 30c, while some of the propellant housings 12 can have a single propellant grain (for example configured like in FIGS. 1-6 and/or as an end burner like in FIG. 7). Therefore, in FIG. 8, the propellant housings 12 in the non-illustrated other half of the motor 10 on the other side of the nozzle axis NA can be similar to the illustrated propellant housings 12 with the end burner propellant grains 30a, 30b, 30c, or the other propellant housings 12 can have a construction similar to the propellant housings 12 in FIGS. 1-6 and/or similar to the construction of the propellant housings 12 in FIG. 7.

In FIG. 8, each propellant grain 30a, 30b, 30c has its own ignition initiator 34a, 34b, 34c connected to the electrical leads 90, and there is an inter-pulse barrier 92 between each of the propellant grains 30a, 30b, 30c. The barriers 92 can be formed of, for example, insulating material such as, but not limited to, ethylene propylene diene terpolymer (EPDM) which may be filled with synthetic fiber material such as KEVLAR®, and keeps each burning propellant grain 30a or 30b from igniting the next propellant grain. The inter-pulse barriers 92 rupture due to the pressure generated when the next grain 30b, 30c ignites allowing the combustion gas to flow through the orifice 32 and into the plenum volume 40. The use of separate propellant grains in the propellant housings 12 permits shorter, less powerful pulses, but increases the number of available pulses.

The embodiment in FIG. 8 operates generally similarly to the embodiments in FIGS. 1-6 and FIG. 7, whereby once the propellant grain 30 is ignited within one of the propellant housings 12, the pressure of the combustion gas ruptures the seal 42 and the combustion gas flows through the orifice 32 and into the plenum volume 40, and then out the throat 46 and the nozzle 16. FIG. 8 differs in allowing one of the additional propellant grains in the propellant housing 12 to be ignited to provide one or more additional pulses from the propellant housing 12.

An example operating sequence of the rocket propulsion motor 10 in FIGS. 1-6 can be as follows. The motor 10 in FIG. 7 and the motor 10 in FIG. 8 have a similar operating sequence. This example operating sequence assumes that the vehicle 18 on which the rocket propulsion motor 10 is mounted is a space vehicle, that the rocket propulsion motor 10 is used as a maneuvering thruster by the space vehicle after the space vehicle has been launched into space using a primary propulsion mechanism (not shown), and that the space vehicle is in space and requires an initial maneuvering thrust by the rocket propulsion motor 10. The operating sequence may vary depending upon the type of vehicle that the rocket propulsion motor 10 is mounted on.

Initially, the actuators 54a, 54b are commanded to extend and thereby deploy the nozzle extension 60. The nozzle extension 60 is locked into place and the guide sleeve 68 disengages from the guide rod 66. A calibration pulse is then initiated by igniting the propellant grain in one of the calibration propellant housings 80. The resulting space vehicle pitch and yaw rates resulting from the calibration pulse are then measured using onboard sensors, and the misalignment angle(s) between the center of gravity (CG) of the space vehicle and the nozzle thrust axis NA are calculated from the space vehicle pitch and yaw rates and/or other attitude data of the space vehicle. The actuators 54a, 54b are then commanded to gimbal the nozzle 16 to a position which would reduce the misalignment angle to zero. If necessary, predictive corrections for shifting of the CG due to propellant consumption during the next propulsive pulse may be made at this time. Thereafter, when a propulsive maneuver is necessary, the propellant grain 30 in one of the propellant housings 12 is ignited to provide a propulsive thrust to conduct the propulsive maneuver. During the propulsive maneuver, the nozzle 16 is preferably locked into position by the actuators 54a, 54b to prevent the nozzle 16 from moving. The angular momentum imparted to the space vehicle during the propulsive maneuver is measured using onboard sensors. Thereafter, one or more of the previous steps can be repeated as needed.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A rocket propulsion motor, comprising:
   a plurality of propellant housings each containing a combustible propellant;
   each propellant housing having a first end, a second end, and a discharge orifice at the first end through which combustion gas resulting from combustion of the combustible propellant is discharged, each one of the discharge orifices having a discharge axis along which combustion gas is discharged, the discharge axes of the discharge orifices are parallel to a longitudinal axis of each propellant housing;
   a discharge plenum defining a plenum volume, each one of the discharge orifices is placed in communication with the plenum volume of the discharge plenum whereby each propellant housing discharges combustion gas into the plenum volume;
   a nozzle downstream from and in fluid communication with the plenum volume and through which combustion gas from the plenum volume is exhausted, the nozzle having a nozzle axis;
   each discharge axis is parallel to the nozzle axis of the nozzle;
   wherein each discharge orifice has a rupturable gas seal associated therewith that prevents communication between combustion gas in the plenum volume and the combustible propellant in the associated propellant housing until the gas seal is ruptured.

2. The rocket propulsion motor of claim 1, wherein the combustible propellant in each propellant housing comprises a single solid propellant grain.

3. The rocket propulsion motor of claim 2, wherein each propellant housing has an ignition initiator configured to ignite the single solid propellant grain therein.

4. The rocket propulsion motor of claim 3, wherein each one of the ignition initiators is connected to a common ignition cap assembly.

5. The rocket propulsion motor of claim 2, wherein for at least one of the propellant housings the single solid propellant grain is configured to burn from the first end thereof toward the second end thereof.

6. The rocket propulsion motor of claim 1, wherein each propellant housing has an insert disposed at the first end thereof, each insert having a single opening that defines the discharge orifice of the associated propellant housing.

7. The rocket propulsion motor of claim 1, further comprising a nozzle extension movably mounted on the nozzle, the nozzle extension being movable relative to the nozzle from a retracted position to an extended position;
   wherein the nozzle has a first expansion ratio when the nozzle extension is at the retracted position, and the nozzle has a second expansion ratio when the nozzle extension is at the extended position, and the first expansion ratio is less than the second expansion ratio; and
   at least one actuator connected to the nozzle extension that is configured to actuate the nozzle extension from the retracted position to the extended position.

8. The rocket propulsion motor of claim 1, wherein the discharge plenum is part of a structure that is separate from the nozzle, the nozzle defines a ball, and the discharge plenum defines a socket that receives the ball, whereby the nozzle is tiltable relative to the discharge plenum.

9. The rocket propulsion motor of claim 8, further comprising actuators connected to the nozzle that are configured to tilt the nozzle relative to the discharge plenum, each actuator having an axis that is parallel to the nozzle axis of the nozzle.

10. The rocket propulsion motor of claim 1, further comprising at least one calibration propellant housing, the at least one calibration propellant housing containing a combustible propellant in an amount that is less than the amount of combustible propellant contained in each of the propellant housings, and the at least one calibration propellant housing has a discharge orifice that is in communication with the plenum volume and through which combustion gas from the at least one calibration propellant housing eaoe is discharged into the plenum volume.

11. A space vehicle that includes the rocket propulsion motor of claim 1.

12. The rocket propulsion motor of claim 1, wherein the discharge plenum has a maximum width, the nozzle has a maximum width, and the maximum width of the discharge plenum is greater than the maximum width of the nozzle.

13. A propulsion motor for a space vehicle, comprising:
    at least three propellant housings each containing solid propellant grain;
    each propellant housing having a first end, a second end, an ignition initiator that is configured to ignite the solid propellant grain, and a discharge orifice at the first end through which combustion gas resulting from combustion of the solid propellant is discharged, each one of the discharge orifices having a discharge axis along which combustion gas is discharged, the discharge axes of the discharge orifices are parallel to a longitudinal axis of each propellant housing;
    a single discharge plenum defining a plenum volume, each one of the discharge orifices is placed in communication with the plenum volume whereby each propellant housing discharges combustion gas into the plenum volume;
    each discharge orifice having a seal that temporarily prevents communication between combustion gas in the plenum volume and the solid propellant grain in the associated propellant housing;
    a nozzle connected to the discharge plenum and receiving combustion gas from the plenum volume, the nozzle having a nozzle axis, a converging section along the nozzle axis leading to a throat, and a diverging section along the nozzle axis and extending from the throat, and combustion gas from the plenum volume flows through the nozzle to generate thrust; and
    each discharge axis is parallel to the nozzle axis of the nozzle.

14. The propulsion motor of claim 13, wherein the seal comprises a rupturable membrane associated with each discharge orifice, and each rupturable membrane is upstream of the converging section.

15. The propulsion motor of claim 13, wherein the solid propellant grain of each propellant housing comprises a single solid propellant grain.

16. The rocket propulsion motor of claim 15, wherein for at least one of the propellant housings the single solid propellant grain is configured to burn from the first end thereof toward the second end thereof.

17. The propulsion motor of claim 13, further comprising a nozzle extension movably mounted on the nozzle, the nozzle extension being movable relative to the nozzle from a retracted position to an extended position;
- wherein the nozzle has a first expansion ratio when the nozzle extension is at the retracted position, and the nozzle has a second expansion ratio when the nozzle extension is at the extended position, and the first expansion ratio is less than the second expansion ratio; and
- at least one actuator connected to the nozzle extension that is configured to actuate the nozzle extension from the retracted position to the extended position.

18. The propulsion motor of claim 13, wherein the nozzle defines a ball, and the discharge plenum defines a socket that receives the ball, whereby the nozzle is tiltable relative to the discharge plenum.

19. The propulsion motor of claim 18, further comprising actuators connected to the nozzle that are configured to tilt the nozzle relative to the discharge plenum, each actuator having an axis that is parallel to the nozzle axis of the nozzle.

20. The propulsion motor of claim 13, further comprising at least one calibration propellant housing, the at least one calibration propellant housing containing solid propellant grain in an amount that is less than the amount of solid propellant grain contained in each of the propellant housings, and the at least one calibration propellant housing has a discharge orifice that is in communication with the plenum volume and through which combustion gas from the at least one calibration propellant housing is discharged into the plenum volume.

21. The propulsion motor of claim 13, comprising between 2 and 36 of the propellant housings each containing solid propellant grain.

22. A space vehicle that includes the propulsion motor of claim 13.

23. The propulsion motor of claim 13, wherein the discharge plenum has a maximum width, the nozzle has a maximum width, and the maximum width of the discharge plenum is greater than the maximum width of the nozzle.

* * * * *